United States Patent
Suga et al.

(10) Patent No.: US 11,814,259 B2
(45) Date of Patent: Nov. 14, 2023

(54) SHEET CONVEYANCE APPARATUS AND IMAGE SCANNING APPARATUS

(71) Applicant: CANON KABUSHIKI KAISHA, Tokyo (JP)

(72) Inventors: Takayuki Suga, Tokyo (JP); Takuya Yamaguchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 17/146,246

(22) Filed: Jan. 11, 2021

(65) Prior Publication Data
US 2021/0245981 A1 Aug. 12, 2021

(30) Foreign Application Priority Data
Feb. 6, 2020 (JP) ................................. 2020-019177

(51) Int. Cl.
*B65H 5/06* (2006.01)
*B65H 5/38* (2006.01)
*H04N 1/00* (2006.01)

(52) U.S. Cl.
CPC ......... *B65H 5/068* (2013.01); *H04N 1/00559* (2013.01); *H04N 1/00591* (2013.01); *H04N 1/00615* (2013.01); *B65H 2404/15* (2013.01); *B65H 2404/19* (2013.01); *B65H 2801/39* (2013.01)

(58) Field of Classification Search
CPC ......... B65H 5/068; B65H 5/062; B65H 5/38; B65H 2404/17; B65H 2404/1431; B65H 2404/54; B65H 2404/6111; H04N 1/00559; H04N 1/00591; H04N 1/00615
See application file for complete search history.

(56) References Cited

U.S. PATENT DOCUMENTS

| 2004/0253030 A1* | 12/2004 | Hamada | H04N 1/00567 |
| | | | 399/367 |
| 2013/0043645 A1* | 2/2013 | Ishihara | B65H 3/0684 |
| | | | 271/225 |
| 2016/0251181 A1* | 9/2016 | Izumichi | B65H 85/00 |
| | | | 271/225 |

FOREIGN PATENT DOCUMENTS

| JP | 2002114404 A | * | 4/2002 |
| JP | 2005225651 A | * | 8/2005 |
| JP | 2006044938 A | * | 2/2006 |
| JP | 2010030718 A | | 2/2010 |

* cited by examiner

*Primary Examiner* — Luis A Gonzalez
(74) *Attorney, Agent, or Firm* — Canon U.S.A., Inc. I.P. Division (57) ABSTRACT

A sheet conveyance apparatus includes a conveyance unit, a conveyance guide, a driven rotary member, and a support portion. The support portion supports a shaft portion of the rotary member driven to rotate by a sheet conveyed by the conveyance unit and guided by the conveyance guide. The support portion includes first and second contact portions that support the shaft portion of the driven rotary member while being in contact with the shaft portion. With respect to a cross section of the shaft portion perpendicular to an axial direction of the shaft portion, the driven rotary member is disposed so that a portion, of the driven rotary member, that is on a lower side in a vertical direction relative to a horizontal line and is on one side in a horizontal direction relative to a vertical line comes into contact with the sheet.

8 Claims, 9 Drawing Sheets

SHEET CONVEYANCE APPARATUS AND IMAGE SCANNING APPARATUS

BACKGROUND

Field

The present disclosure relates to a sheet conveyance apparatus that conveys a sheet, and an image scanning apparatus that scans an image on the sheet conveyed by the sheet conveyance apparatus.

Description of the Related Art

A conventional sheet conveyance apparatus in an image scanning apparatus includes conveyance rollers that convey a sheet, and a conveyance guide that guides the conveyed sheet. Japanese Patent Application Laid-Open No. 2010-30718 discusses a configuration in which a driven roller is provided in a conveyance guide in order to suppress, when a sheet conveyed by conveyance rollers comes into contact with the conveyance guide, occurrence of frictional resistance between the sheet and the conveyance guide and wearing of the conveyance guide.

However, when a driven roller is provided in a conveyance guide, the shaft portion of the driven roller is rotatably supported in the holes of the attachment portion with a clearance between the shaft portion and each of the holes. If a sheet is conveyed while the driven roller is rotatably supported in the attachment portion by such a support portion, the driven roller moves within the clearance range when the sheet comes into contact with the surface of the driven roller. More specifically, when the outer periphery of the shaft portion of the driven roller comes into contact with the inner peripheries of the holes of the attachment portion, abnormal sounds may occur.

SUMMARY

The present disclosure is directed to providing a sheet conveyance apparatus that has a configuration in which a driven roller is rotatably supported in a conveyance guide, and that is capable of suppressing generation of sound due to the driven roller.

According to an aspect of the present disclosure, a sheet conveyance apparatus includes a conveyance unit configured to convey a sheet, a conveyance guide configured to guide the sheet conveyed by the conveyance unit, a driven rotary member configured to be driven to rotate by the conveyed sheet, wherein the driven rotary member protrudes downward from the conveyance guide, and a support portion configured to support a shaft portion of the driven rotary member, wherein the support portion includes a first contact portion and a second contact portion that are in contact with the shaft portion, wherein the first contact portion is provided, with respect to a cross section of the shaft portion perpendicular to an axial direction of the shaft portion, on one side in a horizontal direction relative to a vertical line passing through a center of the shaft portion and on an upper side in a vertical direction relative to a horizontal line passing through the shaft portion center, wherein the second contact portion is provided, with respect to the cross section of the shaft portion perpendicular to the axial direction, on another side in the horizontal direction relative to the vertical line and on a lower side in the vertical direction relative to the horizontal line, wherein the first contact portion and the second contact portion support the shaft portion of the driven rotary member while being in contact with the shaft portion, and wherein, with respect to the cross section of the shaft portion perpendicular to the axial direction, the driven rotary member is disposed so that a portion, of the driven rotary member, that is on the lower side in the vertical direction relative to the horizontal line and is on the other side in the horizontal direction relative to the vertical line comes into contact with the sheet.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the drawings. Sizes, materials, and shapes of components described in the exemplary embodiments described below should be modified based on a configuration of an apparatus to which any of the exemplary embodiments is applied, and based on various conditions. The scope of the present disclosure is not limited to the exemplary embodiments described below.

<Image Scanning Apparatus>

Figure 1:
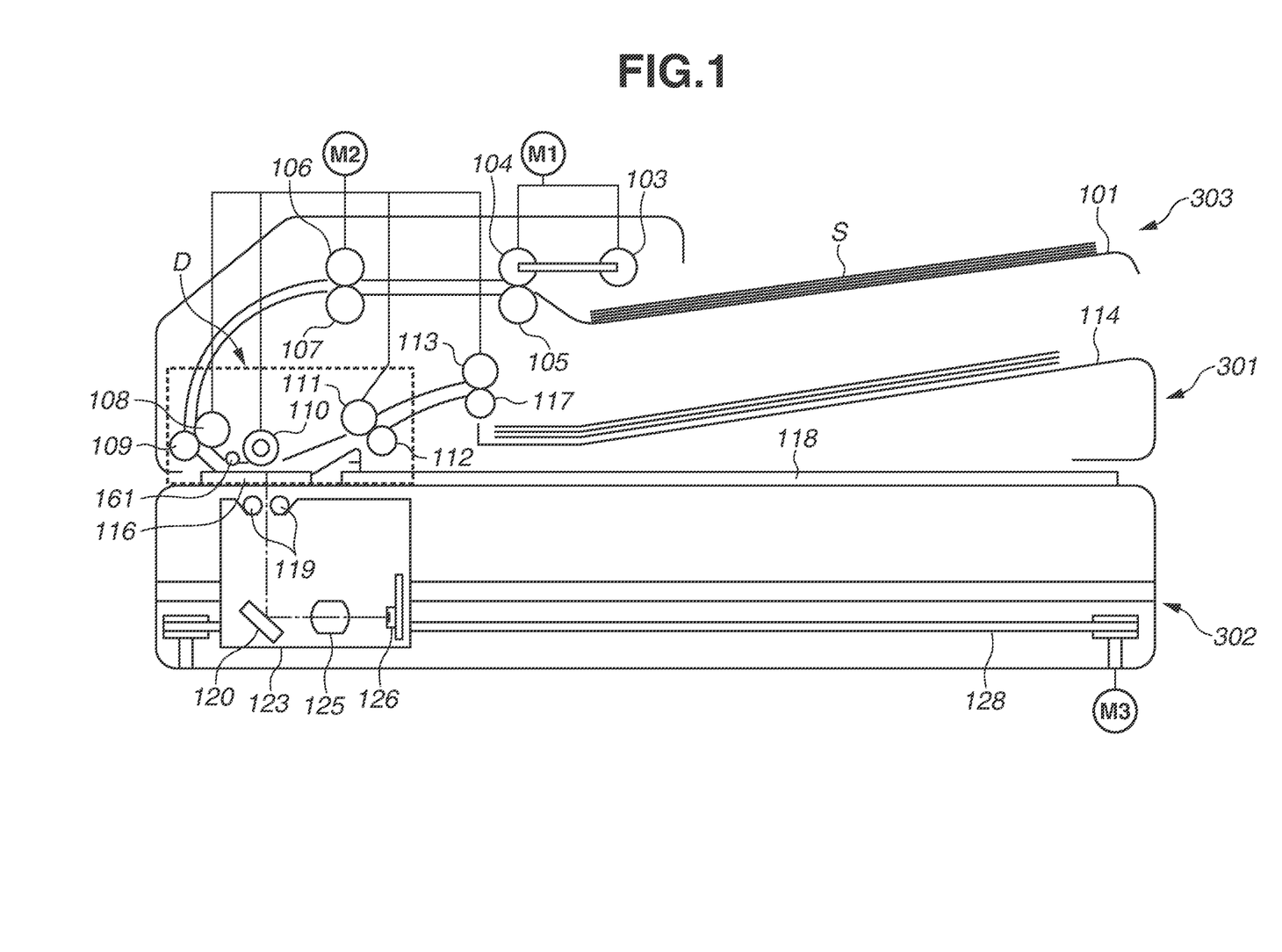
FIG. 1 is a cross-sectional view illustrating an image scanning apparatus according to a first exemplary embodiment of the present disclosure.
Figure 2:
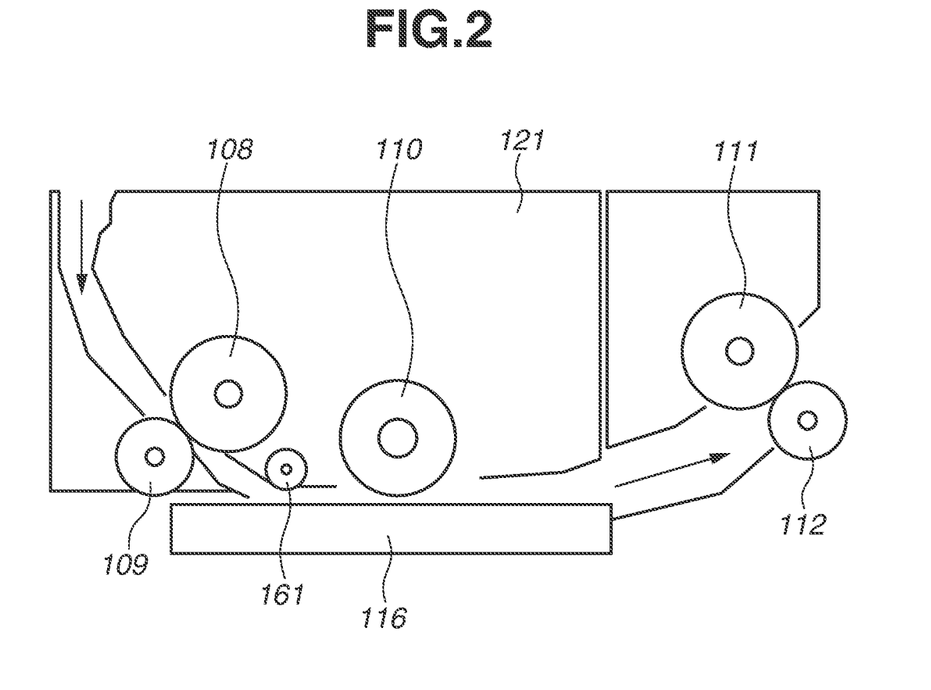
FIG. 2 is an enlarged view illustrating a scanner according to the first exemplary embodiment.

First, an image scanning apparatus according to a first exemplary embodiment of the present disclosure will be described with reference to FIGS. 1 and 2. FIG. 1 is a cross-sectional view illustrating a schematic configuration of an image scanning apparatus 301 according to the first exemplary embodiment. FIG. 2 is an enlarged view of a scanner 302, which scans images, illustrated in FIG. 1. The image scanning apparatus 301 includes a sheet conveyance apparatus 303 in the upper portion of the image scanning apparatus 301, and the scanner 302 in the lower portion of the image scanning apparatus 301.

First, the sheet conveyance apparatus 303 will be described. The sheet conveyance apparatus 303 includes a document tray 101 on which a user stacks sheets of a document S. A sheet feed roller (pick up roller) 103 is provided downstream of the document tray 101 in a sheet conveyance direction. The sheet feed roller 103 is brought into contact with the document S to feed the document S. The sheet feed roller 103 and a conveyance roller 104 are rotated by a sheet feed motor M1 to feed the document S. The conveyance roller 104 as a feed roller is provided downstream of the sheet feed roller 103 in the sheet conveyance direction. A separation roller 105 opposes the conveyance roller 104 and is disposed so as to be pressed against the conveyance roller 104. The separation roller 105 is a retard roller. The separation roller 105 is formed of a rubber material that has friction slightly lower than friction of the conveyance roller 104. The separation roller 105 is driven by the conveyance roller 104. The sheets of the document S fed by the sheet feed roller 103 are separated and fed one by one by the separation roller 105.

A pull-out drive roller 106 and a pull-out driven roller 107 are provided downstream of the conveyance roller 104 in the sheet conveyance direction. The sheets of the document S separated one by one by the separation roller 105 are pulled out and further conveyed downstream by the pull-out drive roller 106 and the pull-out driven roller 107. Lead drive rollers 108 and lead driven rollers 109, which serve as a conveyance unit, are provided downstream of the pull-out drive roller 106 in the sheet conveyance direction. The lead drive rollers 108 and the lead driven rollers 109 convey the document S to an image scanning glass 116. A platen guide roller 110 is disposed opposing the image scanning glass 116.

Image information on the front side of the document S passing through the image scanning glass 116 is scanned by a charge coupled device (CCD) line sensor 126 of the scanner 302. Lead discharge drive rollers 111 and lead discharge driven rollers 112 are provided downstream of the platen guide roller 110 in the sheet conveyance direction. The lead discharge drive rollers 111 and the lead discharge driven rollers 112 convey the document S on which the image has been scanned to a sheet discharge drive roller 113 and a sheet discharge driven roller 117. The sheet discharge drive roller 113 discharges the document S to a sheet discharge tray 114. The pull-out drive roller 106, the lead drive rollers 108, the lead discharge drive rollers 111, and the sheet discharge drive roller 113 are rotated by a conveyance motor M2 transmitting a driving force thereto. As illustrated in FIG. 2, driven rollers 161 as driven rotary members are provided in a first conveyance guide 121 as a conveyance guide, and are located between the lead drive rollers 108 and the platen guide roller 110. The driven rollers 161 are driven to rotate by the conveyed document S to suppress the wearing of the first conveyance guide 121 and the generation of rubbing noise due to contact of the document S with the first conveyance guide 121. The details will be described in detail below.

As described above, the document S stacked on the document tray 101 is conveyed by the sheet conveyance apparatus 303 to scan the image on the document S.

Next, the scanner 302 will be described. The scanner 302 includes lamps 119 that emit light to the image scanning glass 116, and a mirror 120 that guides light reflected from the document S to a lens 125 and the CCD line sensor 126. The lamps 119 and the mirror 120 are attached to a carriage 123. Light reflected (diffused) by the document S is guided to the lens 125 via the mirror 120. The lens 125 forms an image of the reflected light on a light receiving unit of the CCD line sensor 126. The CCD line sensor 126 uses a light receiving element to perform photoelectric conversion of the formed reflected light image, and outputs an electric signal corresponding to the amount of incident light. If the document S is conveyed by the sheet conveyance apparatus 303 to scan the image as described above, the carriage 123 is held at a position illustrated in FIG. 1. On the other hand, if the document S is placed directly on a platen glass 118 to scan the image, the carriage 123 moves along the platen glass 118. In this case, a drive motor M3 drives a timing belt 128 connected with the carriage 123 to move the carriage 123.

As described above, operations of the sheet conveyance apparatus 303 and the scanner 302 allow the image scanning apparatus 301 to convey and scan the document S stacked on the document tray 101.

<Overview of Driven Roller Attachment Portion>

Figure 3:
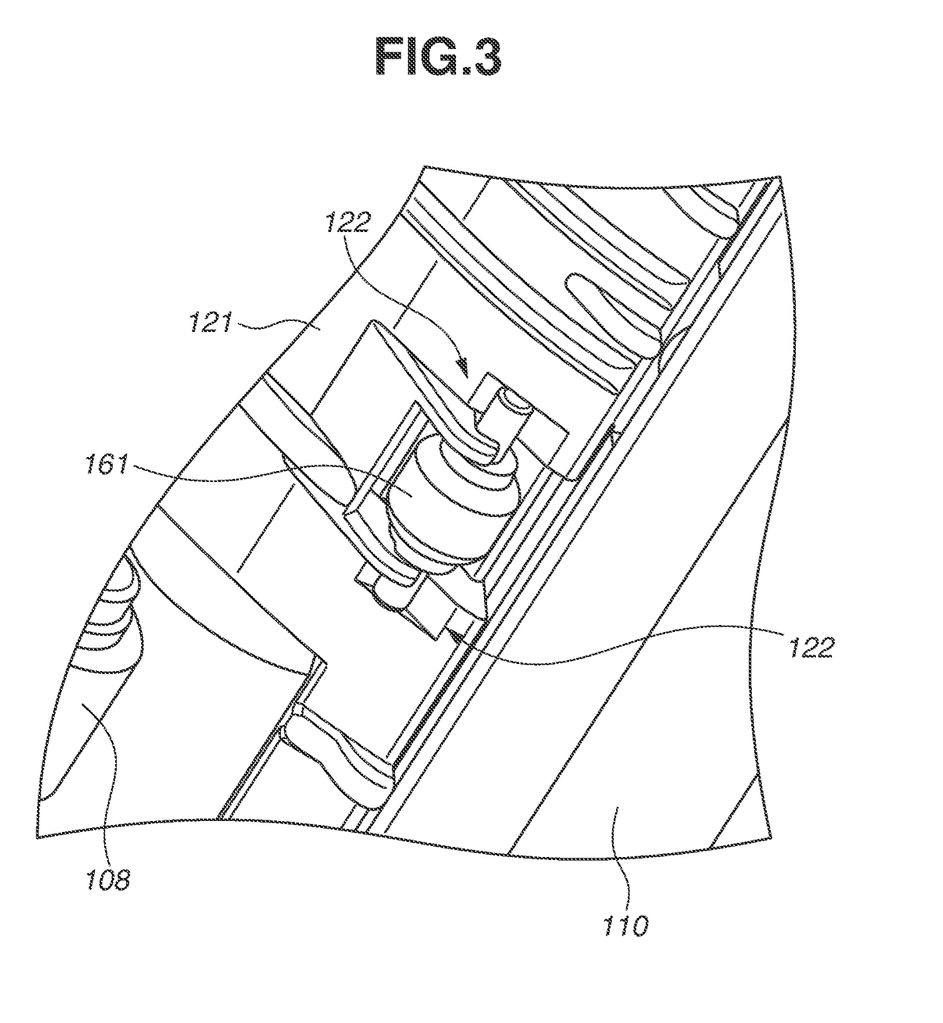
FIG. 3 is a perspective view illustrating one of driven rollers and an attachment portion according to the first exemplary embodiment.

FIG. 3 is an enlarged view illustrating an attachment portion of one of the driven rollers 161 according to the present exemplary embodiment. The driven rollers 161 are provided between the platen guide roller 110 and the lead drive rollers 108 in the sheet conveyance direction. The driven rollers 161 are rotatably supported in the first conveyance guide 121.

Figure 4:
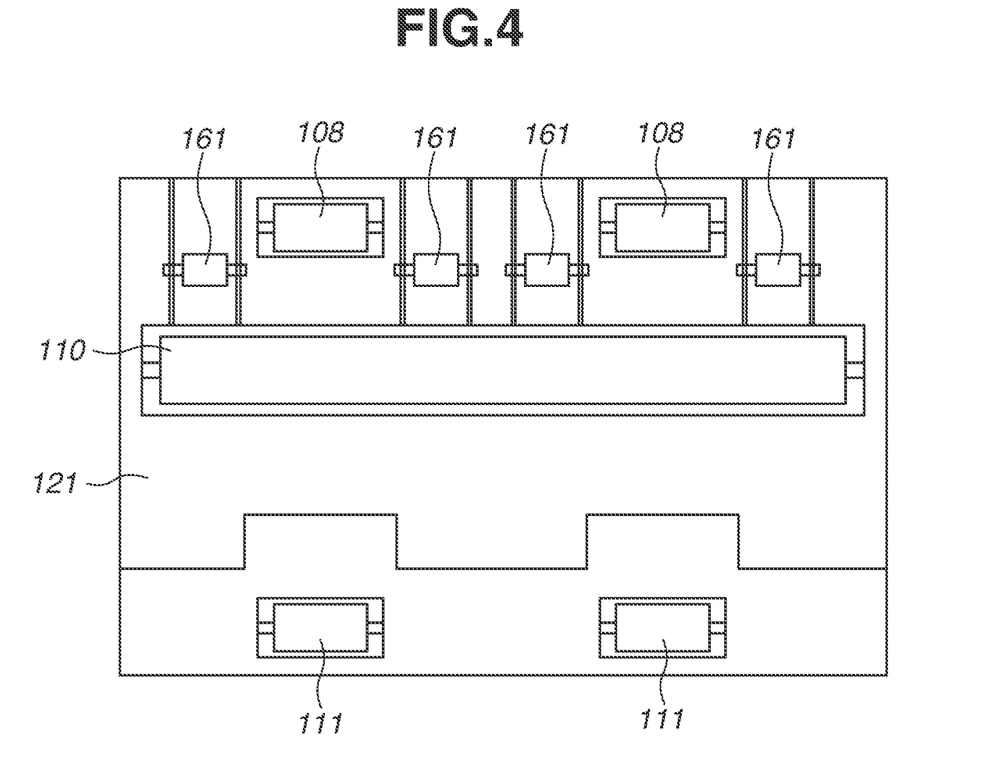
FIG. 4 is a bottom view illustrating the driven rollers according to the first exemplary embodiment.

FIG. 4 is a diagram illustrating the first conveyance guide 121, which supports the driven rollers 161, viewed from the image scanning glass 116 illustrated in FIG. 2. In the present exemplary embodiment, the plurality of driven rollers 161 is provided. More specifically, the four driven rollers 161 are provided in a sheet width direction perpendicular to the sheet conveyance direction, thereby supporting document sheets of various sizes from a sheet with a narrow width to a sheet with a wide width.

Figure 5A:
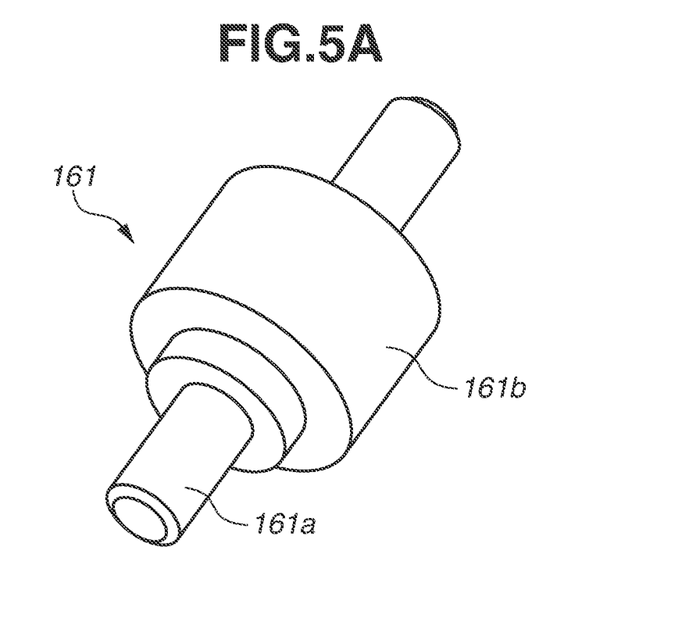
FIG. 5A is a perspective view illustrating one of the driven rollers according to the first exemplary embodiment.
Figure 5B:
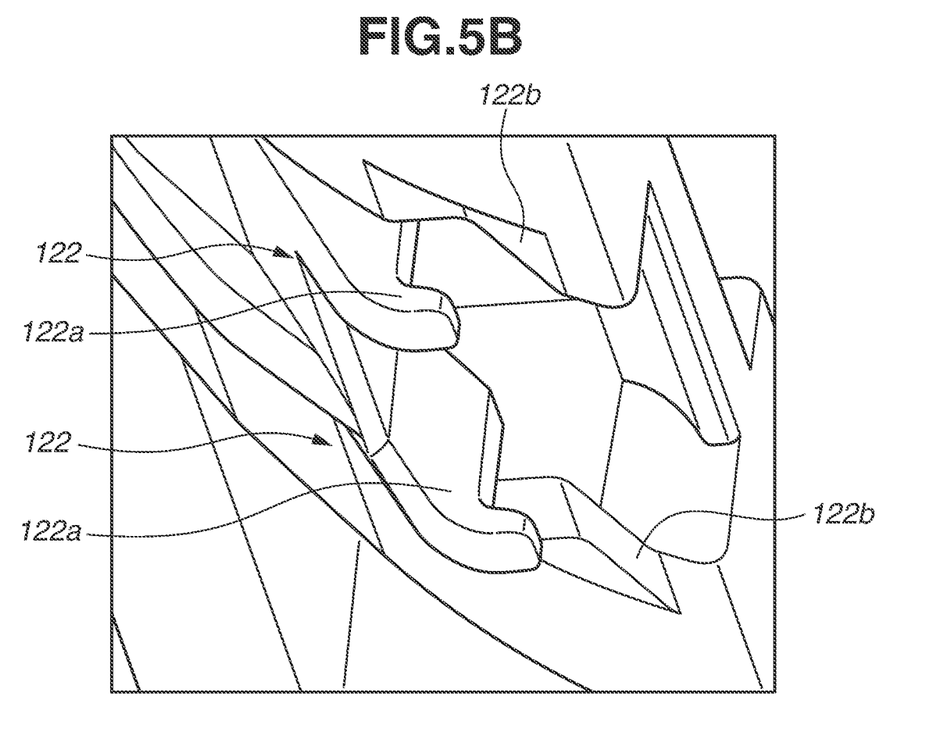
FIG. 5B is a perspective view illustrating support portions according to the first exemplary embodiment.

FIG. 5A illustrates one of the driven rollers 161. FIG. 5B illustrates support portions 122 for supporting the driven roller 161 in the first conveyance guide 121. As illustrated in FIG. 5A, each of the driven rollers 161 includes a roller portion 161b made of resin, and a shaft portion 161a made of metal. In other words, the roller portion 161b and the shaft portion 161a are formed of separate members. The driven roller 161 rotates about the shaft portion 161a. The shaft portion 161a is supported so as to protrude from both side surfaces of the roller portion 161b in an axial direction. The roller portion 161b is rotatable about the shaft portion 161a. As illustrated in FIG. 5B, the first conveyance guide 121 includes the support portions 122 that rotatably support the driven roller 161. The two support portions 122 are provided for each of the driven rollers 161 in the width direction to support both ends of the shaft portion 161a. Each of the support portions 122 includes a first support portion 122a that supports a lower portion of the shaft portion 161a, and a second support portion 122b that supports a side portion of the shaft portion 161a. The first support portion 122a and the second support portion 122b are formed so that the positions are shifted from each other in the axial direction. This is due to molding of the first conveyance guide 121.

<Configuration for Supporting Shaft Portion of Driven Roller>

Figure 6:
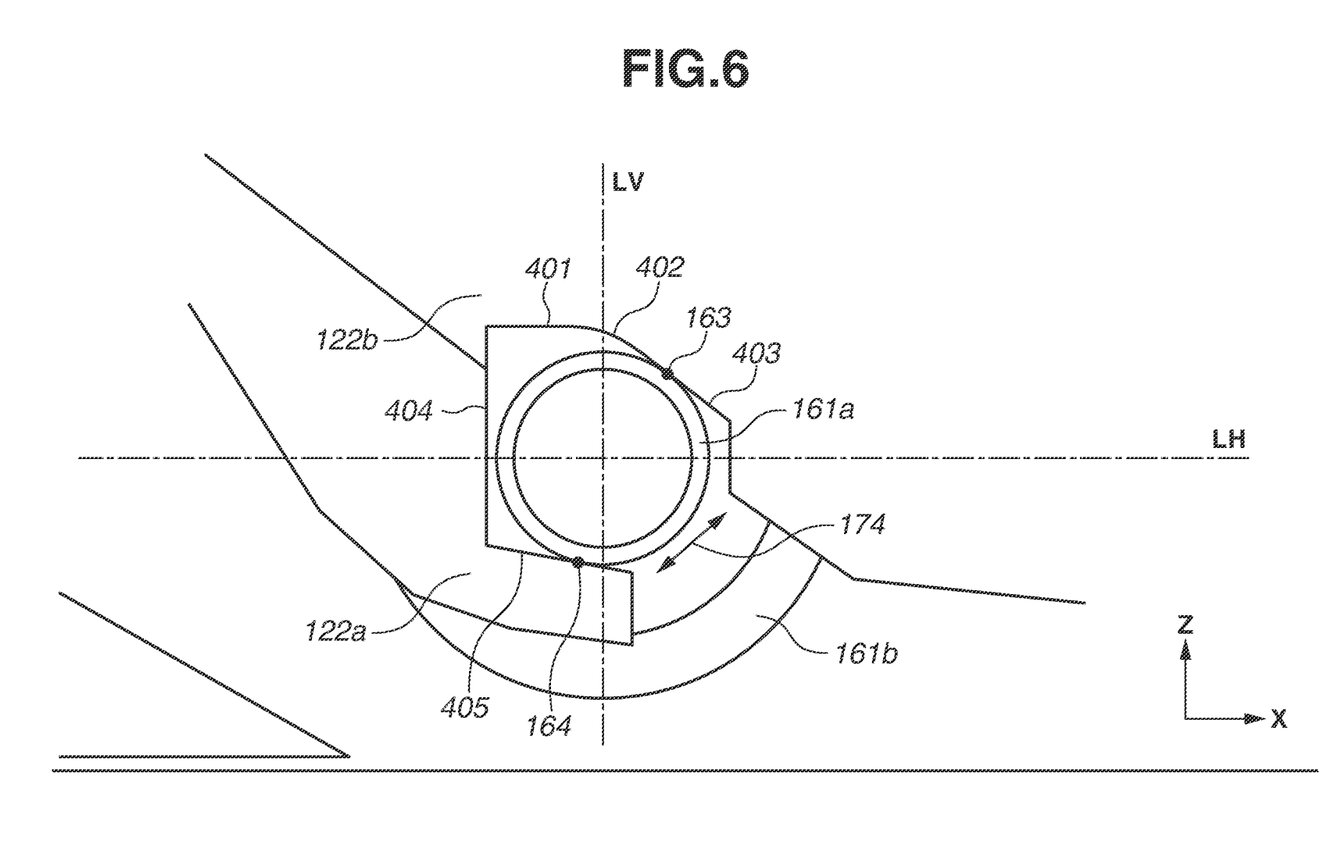
FIG. 6 is a diagram illustrating a configuration in which one of the driven rollers is supported according to the first exemplary embodiment.

Next, a configuration for supporting the shaft portion 161a will be described as a characteristic feature of the present exemplary embodiment, with reference to FIG. 6. FIG. 6 is a cross-sectional view illustrating the shaft portion 161a of the driven roller 161 attached to the support portions 122. In FIG. 6, the shaft portion 161a is in contact with a second plane 405 of the first support portion 122a and a first plane 403 of the second support portion 122b, and is stationary. The first plane 403 and the second plane 405 slope downward toward the downstream side in the sheet conveyance direction so as to become closer to a document conveyance path. Thus, the driven roller 161 supported by the support portions 122 moves downward to the right, when viewed from FIG. 6, due to the own weight of the driven roller 161. The shaft portion 161a is naturally in contact with both the first plane 403 and the second plane 405. In the natural state, a clearance is provided between the shaft portion 161a and a side surface 404 of the first support portion 122a and between the shaft portion 161a and an upper surface 401 of the second support portion 122b. The first plane 403 and the upper surface 401 are continuously formed through a circular-arc surface 402 having a circular-arc shape. A circular-arc radius of the circular-arc surface 402 is larger than or equal to a radius of the shaft portion 161a of the driven roller 161.

As illustrated in FIG. 6, a first contact portion 163 is a position where the shaft portion 161a is in contact with the first plane 403. A second contact portion 164 is a position where the shaft portion 161a is in contact with the second plane 405. In this state, the first contact portion 163 is on one side in a horizontal direction relative to a vertical line LV passing through the center of the shaft portion 161a. In addition, the first contact portion 163 is on the upper side in a vertical direction relative to a horizontal line LH passing through the center of the shaft portion 161a. In other words, the first contact portion 163 is in the first quadrant in the graph of the horizontal line LH and the vertical line LV.

The second contact portion 164 is on the other side in the horizontal direction relative to the vertical line LV. In addition, the second contact portion 164 is on the lower side in the vertical direction relative to the horizontal line LH passing through the center of the shaft portion 161a. In other words, the second contact portion 164 is in the third quadrant in the graph of the horizontal line LH and the vertical line LV.

In the present exemplary embodiment, each of the driven rollers 161 is disposed so that the conveyed document S makes contact with an outer periphery portion of the roller portion 161b that is on the lower side in the vertical direction relative to the horizontal line LH and that is on the other side in the horizontal direction relative to the vertical line LV. Each of the support portions 122 that support the shaft portion 161a has an opening 174 in part of the support portion 122. The opening 174 has a width narrower than a diameter of the shaft portion 161a. When the shaft portion 161a is attached to the support portions 122, the first support portion 122a made of resin is elastically deformed.

<Reduction of Noise from Driven Roller During Sheet Conveyance>

Figure 7:
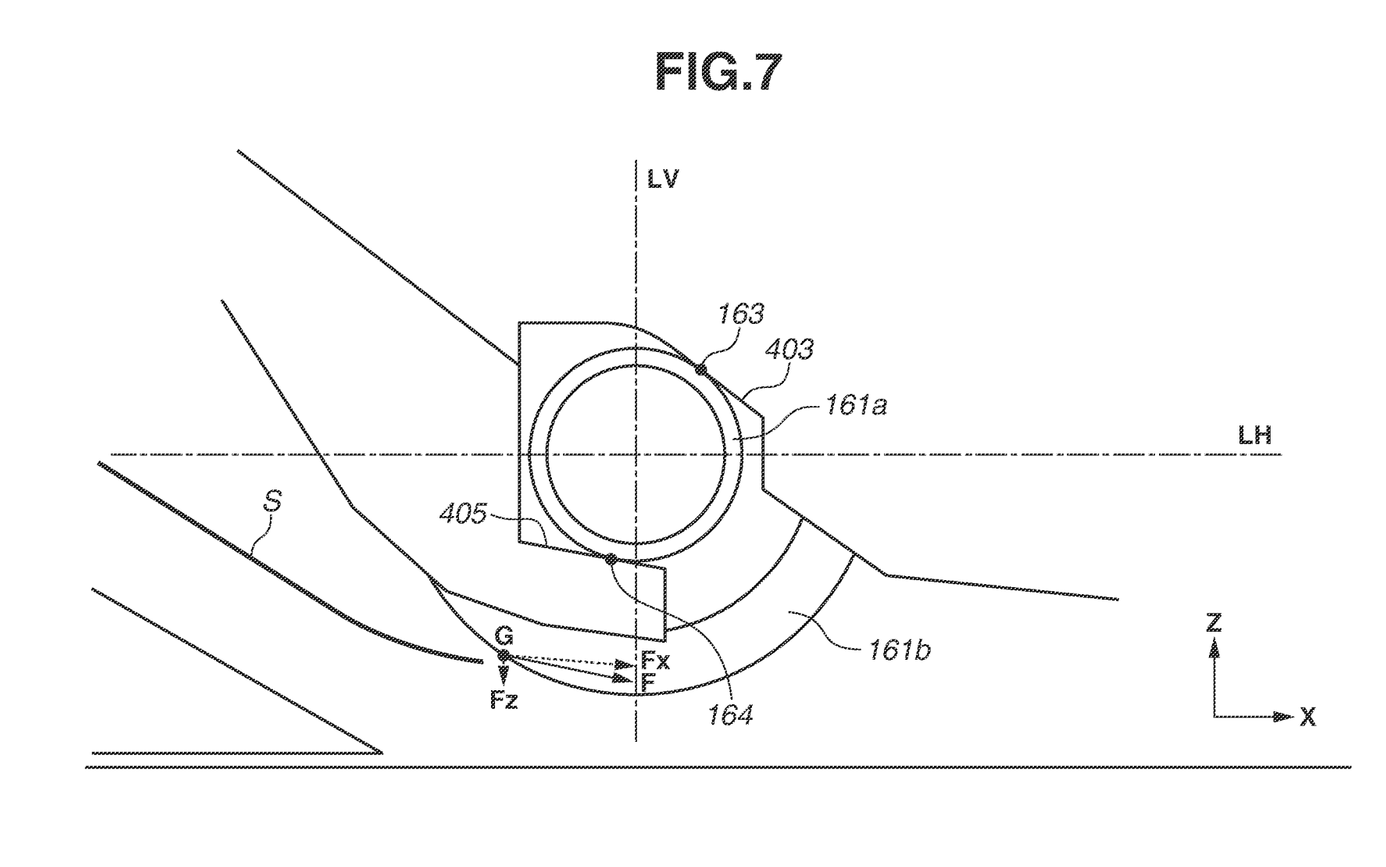
FIG. 7 is a diagram illustrating a state where a leading edge of a sheet comes into contact with the driven rollers according to the first exemplary embodiment.
Figure 8:
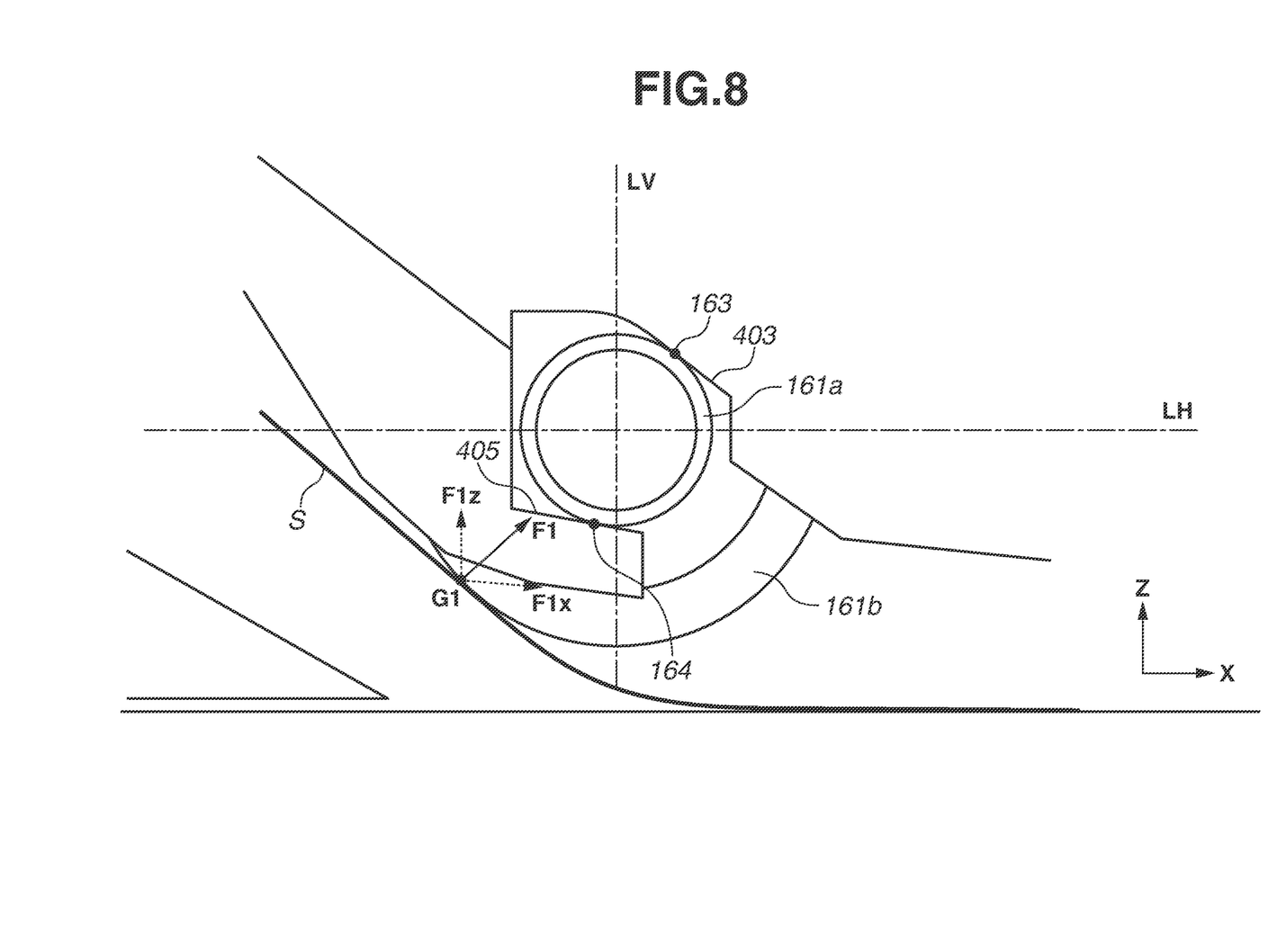
FIG. 8 is a diagram illustrating a state where a back side of a sheet comes into contact with the driven rollers according to the first exemplary embodiment.

Next, reduction of noise from the driven rollers 161 during sheet conveyance by supporting the driven rollers 161 as described above will be described. There are two following cases regarding noise reduction. The first case is when a leading edge of the conveyed document S hits the driven rollers 161 as illustrated in FIG. 7. The second case is when a back side of the document S makes contact with the driven rollers 161 when the document S is conveyed by conveyance rollers located downstream of the driven rollers 161, as illustrated in FIG. 8.

First, the first case where the leading edge of the document S hits the driven rollers 161 will be described. As illustrated in FIG. 7, the leading edge of the document S conveyed by the lead drive rollers 108 comes into contact with a contact point G of each of the driven rollers 161. Then at the contact point G, a force F acts in a direction in which the leading edge of the document S comes into contact with the driven roller 161. The force F is divided into a force Fx in an X direction and a force Fz in a Z direction. The force Fx and the force Fz act to move the driven roller 161 in the X direction and the Z direction. In the present exemplary embodiment, however, the shaft portion 161a of the driven roller 161 is naturally in contact with the first plane 403 and the second plane 405. Thus, the driven roller 161 cannot move in the X direction or the Z direction. This can suppress generation of sound when the leading edge of the document S comes into contact with the driven roller 161. If there is a clearance between the shaft portion 161a and the support portion 122 in the X direction and the Z direction, the shaft portion 161a moves within the clearance range. Accordingly, when the shaft portion 161a comes into contact with a plane of the support portion 122, noise occurs.

Next, the second case where the back side of the document S makes contact with the driven rollers 161 when conveyed by the conveyance rollers downstream of the driven rollers 161 will be described. As illustrated in FIG. 8, when the document S is conveyed by the various conveyance rollers provided downstream of the driven rollers 161, the driven rollers 161 make contact with the back side of the document S at a contact point G1 of each of the driven rollers 161. Then at the contact point G1, a force F1 acts toward the center of rotation of the driven roller 161. Similarly to the first case, the force F1 is divided into a force F1x in the X direction and a force F1z in the Z direction. The force F1x and the force F1z act to move the driven roller 161 in the X direction and the Z direction. In the present exemplary embodiment, however, the shaft portion 161a of the driven roller 161 is naturally in contact with the first plane 403. Thus, the driven roller 161 cannot move in the X direction. The force F1z acts to move the driven roller 161 upward in the Z direction. However, the circular-arc surface 402 formed continuously upward from the first plane 403 prevents the movement, thereby suppressing the generation of noise due to the movement.

The above-described configuration can suppress the generation of noise when the back side of the document S comes into contact with the driven rollers 161. An angle formed by the first plane 403 and the force F1 is set to an acute angle.

In the present exemplary embodiment, the configuration in which the driven rollers 161 are arranged between the lead drive rollers 108 and the platen guide roller 110 has been described. However, alternatively, if the driven rollers 161 are provided on another sheet conveyance path, such as on the upstream side of the lead drive rollers 108 or on the upstream or downstream side of the lead discharge drive rollers 111, the effect of suppressing the generation of noise can be obtained by using the above-described configuration of the support portions 122.

Figure 9:
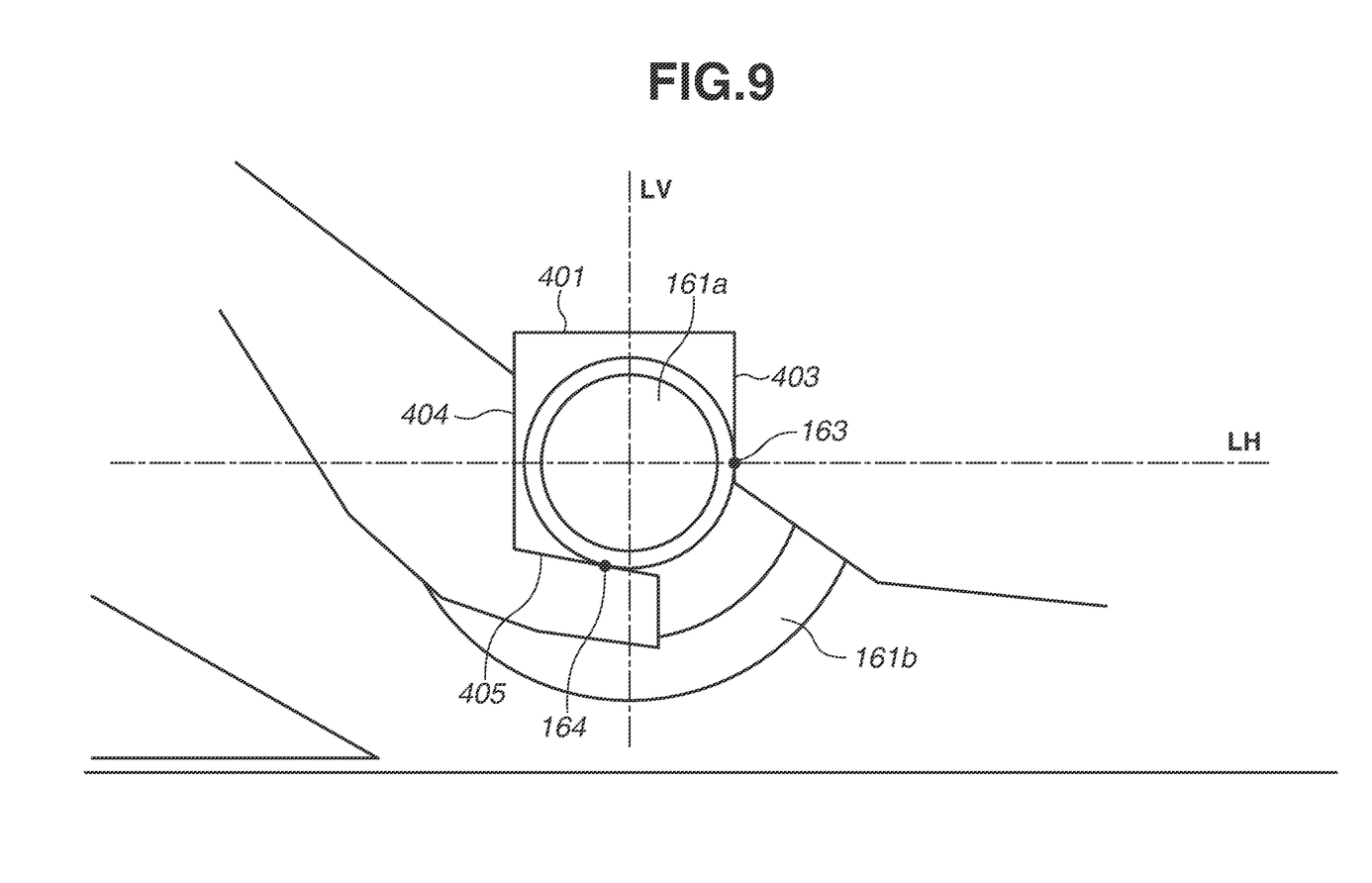
FIG. 9 is a diagram illustrating a configuration in which one of driven rollers is supported according to a second exemplary embodiment.

In a second exemplary embodiment, the first contact portion 163 according to the first exemplary embodiment is modified as illustrated in FIG. 9. As illustrated in FIG. 9, the first contact portion 163 is disposed so as to be in contact with the shaft portion 161a on or below the horizontal line LH in a cross-sectional vertical direction. In the present exemplary embodiment, only a difference from the first exemplary embodiment will be described.

Similarly to the first exemplary embodiment, the first contact portion 163 is a position where the shaft portion 161a is in contact with the first plane 403. The second contact portion 164 is a position where the shaft portion 161a is in contact with the second plane 405. The first plane 403 is substantially parallel to the vertical line LV. The first plane 403 and the upper surface 401 are continuously formed and substantially perpendicular to each other.

In this state, the first contact portion 163 is on one side in the horizontal direction relative to the vertical line LV passing through the center of the shaft portion 161a. In addition, the first contact portion 163 is at the same height in the vertical direction as the horizontal line LH passing through the center of the shaft portion 161a. Alternatively, the first contact portion 163 may be on the lower side in the vertical direction relative to the horizontal line LH passing through the center of the shaft portion 161a. In other words, the first contact portion 163 is in the fourth quadrant in the graph of the horizontal line LH and the vertical line LV. Similarly to the first exemplary embodiment, the second contact portion 164 is in the third quadrant in the graph of the horizontal line LH and the vertical line LV.

Similarly to the configuration described in the first exemplary embodiment, the configuration described above can suppress the generation of sound when the document S is conveyed and comes into contact with the driven rollers 161.

While, in the first and second exemplary embodiments, the configuration in which the shaft portion 161a and the roller portion 161b are formed of separate components has been described, a configuration in which the shaft portion 161a and the roller portion 161b are formed in an integrated manner can provide a similar effect.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-019177, filed Feb. 6, 2020, which is hereby incorporated by reference herein in its entirety.

What is claimed is:

1. A sheet conveyance apparatus comprising:
a conveyance unit configured to convey a sheet;
a conveyance guide configured to guide the sheet conveyed by the conveyance unit;
a driven rotary member configured to be driven to rotate by the conveyed sheet, wherein the driven rotary member protrudes downward from the conveyance guide; and
a support portion configured to support a shaft portion of the driven rotary member,
wherein the support portion includes a first plane portion and a second plane portion that are in contact with the shaft portion, and the first plane portion and the second plane portion each slope toward a downstream side in a conveyance direction so as to become closer to a conveyance path of the sheet,
wherein, as viewed in an axial direction of the shaft portion, the first plane portion is in contact with the shaft portion on a downstream side in the conveyance direction relative to a center of the shaft portion and above the center of the shaft portion in a vertical direction, and
wherein, as viewed in the axial direction of the shaft portion, the second plane portion is in contact with the shaft portion on an upstream side in the conveyance direction relative to the center of the shaft portion and below the center of the shaft portion in the vertical direction.

2. The sheet conveyance apparatus according to claim 1, wherein the support portion further includes an upper surface located over the shaft portion of the driven rotary member, and the upper surface and the first plane portion are formed as a continuous surface and have a circular-arc surface between the upper surface and the first plane portion, and
wherein the circular-arc surface is in a shape of a circular arc, and a radius of the circular arc of the circular-arc surface is larger than a radius of the shaft portion of the driven rotary member.

3. The sheet conveyance apparatus according to claim 1, wherein the driven rotary member includes the shaft portion made of metal and a roller portion made of resin, and the roller portion is supported so as to be rotatable about the shaft portion.

4. The sheet conveyance apparatus according to claim 1, wherein, as viewed in the axial direction of the shaft portion, the driven rotary member is configured to come into contact with the sheet on the upstream side in the conveyance direction relative to the center of the shaft portion and below the center of the shaft portion in the vertical direction.

5. The sheet conveyance apparatus according to claim 1, wherein the first plane portion and the second plane portion are formed so that positions of the first plane portion and the second plane portion are shifted from each other in the axial direction.

6. The sheet conveyance apparatus according to claim 1, wherein the support portion includes two end support parts configured to support respective ends of the shaft portion.

7. An image scanning apparatus comprising:
the sheet conveyance apparatus according to claim 1; and
a scanner configured to scan an image on the sheet conveyed by the sheet conveyance apparatus.

8. The image scanning apparatus according to claim 7, wherein the driven rotary member is located adjacent to a reading position of the scanner in the conveyance direction.

* * * * *